United States Patent
Hanyu (10) Patent No.: US 8,179,638 B2
(45) Date of Patent: May 15, 2012

(54) HEAD WITH SLIDER SUPPRESSING BACK FLOW, HEAD SUSPENSION ASSEMBLY, AND DISK DEVICE PROVIDED WITH THE SAME

(75) Inventor: Mitsunobu Hanyu, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 47 days.

(21) Appl. No.: 12/975,305

(22) Filed: Dec. 21, 2010

(65) Prior Publication Data

US 2011/0090597 A1 Apr. 21, 2011

Related U.S. Application Data

(63) Continuation of application No. 12/241,628, filed on Sep. 30, 2008, now abandoned.

(30) Foreign Application Priority Data

Nov. 30, 2007 (JP) ................................. 2007-311344

(51) Int. Cl.
*G11B 5/60* (2006.01)
(52) U.S. Cl. ................................. 360/235.7; 360/236.5
(58) Field of Classification Search .... 360/235.5–236.3, 360/236.5
See application file for complete search history.

(56) References Cited

U.S. PATENT DOCUMENTS

| | | | | |
|---|---|---|---|---|
| 5,796,551 A | * | 8/1998 | Samuelson | 360/236.8 |
| 6,229,671 B1 | * | 5/2001 | Boutaghou et al. | 360/235.1 |
| 2001/0030835 A1 | * | 10/2001 | Hipwell et al. | 360/237 |
| 2003/0169535 A1 | * | 9/2003 | Boutaghou | 360/236.5 |
| 2005/0280943 A1 | * | 12/2005 | Inoue et al. | 360/236.2 |
| 2007/0121251 A1 | * | 5/2007 | Yoshida | 360/236.3 |

* cited by examiner

*Primary Examiner* — Allen Heinz
(74) *Attorney, Agent, or Firm* — Knobbe, Martens, Olson & Bear, LLP (57) ABSTRACT

According to one embodiment, a slider of a magnetic head is provided with a negative-pressure cavity formed in a facing surface, a leading step portion situated on the upstream side of the negative-pressure cavity, a pair of side portions opposed to each other, a trailing step portion situated on the outlet end side of the negative-pressure cavity, and a pair of embossed portions formed on the facing surface so as to project from the negative-pressure cavity and provided on the outlet side of the negative-pressure cavity with respect to an airflow. The embossed portions individually extend along a second direction so as to be situated individually on the opposite sides of the trailing step portion and are formed so as to be lower than the trailing step portion with respect to the negative-pressure cavity and flush with an outlet-side end surface of the slider.

6 Claims, 7 Drawing Sheets

HEAD WITH SLIDER SUPPRESSING BACK FLOW, HEAD SUSPENSION ASSEMBLY, AND DISK DEVICE PROVIDED WITH THE SAME

CROSS-REFERENCE TO RELATED APPLICATIONS

This is a continuation of U.S. patent application Ser. No. 12/241,628, filed Sep. 30, 2008, which is based upon and claims the benefit of priority from Japanese Patent Application No. 2007-311344, filed Nov. 30, 2007, the entire contents of both of which are incorporated herein by reference.

BACKGROUND

1. Field

One embodiment of the invention relates to a head used in a disk device such as a magnetic disk device, a head suspension assembly provided with the head, and a disk device provided with the head suspension assembly.

2. Description of the Related Art

A disk device, e.g., a magnetic disk device, includes a magnetic disk, spindle motor, magnetic head, and carriage assembly. The magnetic disk is arranged in a case. The spindle motor supports and rotates the disk. The magnetic head writes and reads information to and from the disk. The carriage assembly supports the magnetic head for movement with respect to the magnetic disk. The carriage assembly includes a rotatably supported arm and a suspension extending from the arm. The magnetic head is supported on an extended end of the suspension. The head includes a slider attached to the suspension and a head portion on the slider. The head portion is constructed including a reproducing element for reading and a recording element for writing.

The slider has a facing surface (air bearing surface: ABS) that is opposed to a recording surface of the magnetic disk. A predetermined head load directed to a magnetic recording layer of the disk is applied to the slider by the suspension. When the magnetic disk device operates, an airflow is generated between the disk in rotation and the slider. Based on the principle of aerodynamic lubrication, a force (positive pressure) to fly the slider above the recording surface of the disk acts on the facing surface of the slider. By balancing this flying force with the head load, the slider is flown with a given gap above the recording surface of the disk. There is provided a disk device in which a negative-pressure cavity or a dynamic pressure generating groove is formed near the center of the facing surface of the slider in order to prevent fluctuations of the flying height.

In a conventional magnetic disk, moreover, a lubricant is spread thinly on the disk surface to reduce its abrasion by contact with a magnetic head. Although most of the lubricant adheres to the disk surface, a small portion may sometimes leave the disk surface and adhere to a facing surface of a slider. If the lubricant adheres to the slider, the adhesion increases gradually. If this adhesion exceeds a certain level, the lubricant drops from the slider onto the disk surface and forms a protuberance that adheres to the disk surface. If this protuberance of the lubricant is formed on the disk surface, the magnetic head unduly floats above the disk surface as it passes over the protuberance, thereby incurring a so-called high-fly write state. In some cases, therefore, the magnetic head may fail to accurately write and read information to and from the disk surface.

There is provided a device in which a plurality of noncontinuous portions are arranged on a facing surface of a slider to form standing-air regions that prevent a lubricant from adhering to the surface of a slider by a surface tension between the slider surface and the disk surface (e.g., Japanese Publication No. 2001-503903).

In the magnetic disk device, most of air that flows between the disk surface and the slider forms regular flows that run from the air inlet end side of the slider to the outlet end side. However, some of the air forms backflows that run reversely between the slider and the disk surface after having once run out of the slider.

If such backflows occurs, the lubricant that is lifted above the disk surface flows toward and adheres to the facing surface of the slider. If the adhesion of the lubricant gradually increases, the lubricant finally drops on the disk surface and forms a protuberance that adheres to the disk surface. If this protuberance of the lubricant is formed on the disk surface, as mentioned before, the magnetic head unduly floats above the disk surface, thereby incurring the so-called high-fly write.

Although the adhesion of the lubricant that is attributable to the surface tension can be reduced in the conventional magnetic disk device described above, it is difficult to suppress the adhesion of the lubricant that is caused by the backflows.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a head comprises: a slider which has a facing surface opposed to a surface of a rotatable recording medium, an inlet-side end surface extending across the facing surface, and an outlet-side end surface extending across the facing surface and is caused to fly by an airflow which is produced between the recording medium surface and the facing surface as the recording medium rotates; and a head portion which is provided on the slider and records and reproduces information to and from the recording medium, the facing surface of the slider having a first direction along the airflow and a second direction perpendicular to the first direction, the slider including a negative-pressure cavity which is defined by a recess formed in the facing surface and produces a negative pressure, a leading step portion which is formed on the facing surface so as to project from the negative-pressure cavity and situated on an upstream side of the negative-pressure cavity with respect to the airflow, a pair of side portions which are individually formed on the facing surface so as to project from the negative-pressure cavity, extend from the leading step portion toward the outlet end side of the slider in the first direction, and are opposed to each other with a space therebetween in the second direction, a trailing step portion which is formed on the facing surface so as to project from the negative-pressure cavity, is situated on an outlet side of the negative-pressure cavity with respect to the airflow, and has a top surface opposed to the recording medium, and a pair of embossed portions which are formed on the facing surface so as to project from the negative-pressure cavity and provided on the outlet side of the negative-pressure cavity with respect to the airflow, the embossed portions individually extending in the second direction and being situated individually on the opposite sides of the trailing step portion with respect to the second direction, the embossed portions being lower than the trailing step portion with respect to the negative-pressure cavity and flush with the outlet-side end surface of the slider.

A first embodiment in which a disk device according to this invention is applied to a hard disk drive (HDD) will now be described in detail with reference to the accompanying drawings.

Figure 1:
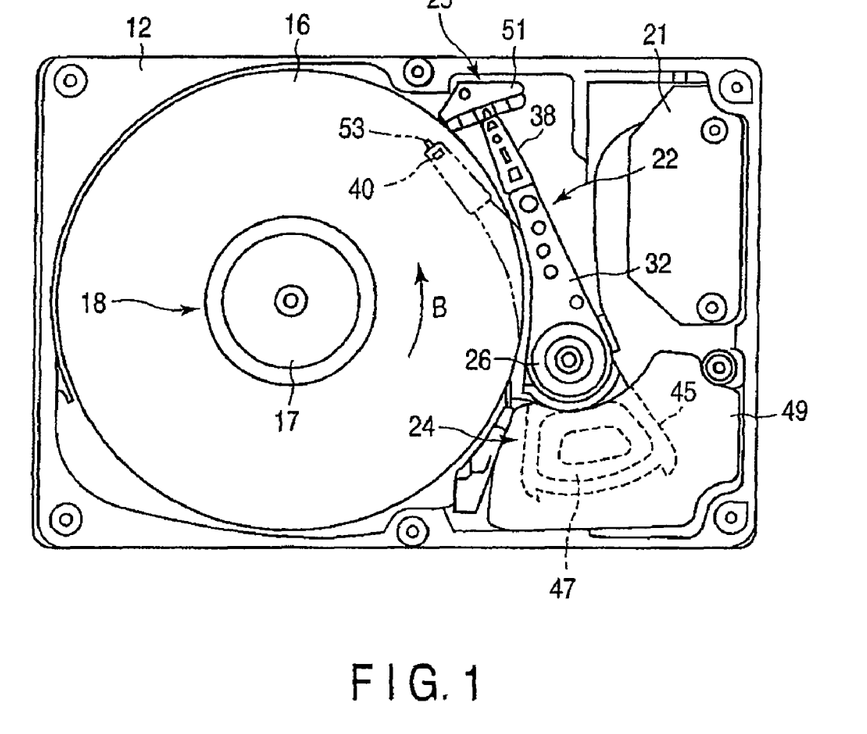
FIG. 1 is an exemplary plan view showing an HDD according to a first embodiment of the invention.

As shown in FIG. 1, the HDD includes a case 12 in the form of an open-topped rectangular box and a top cover (not shown). The top cover is fastened to the case by screws so as to close the top opening of the case.

The case 12 contains a magnetic disk 16, spindle motor 18, magnetic heads 40, carriage assembly 22, voice coil motor (VCM) 24, ramp load mechanism 25, board unit 21, etc. The magnetic disk 16 serves as a recording medium. The spindle motor 18 serves as a drive section that supports and rotates the disk. The magnetic heads write and read information to and from the disk. The carriage assembly 22 supports the heads for movement with respect to the disk 16. The VCM 24 rotates and positions the carriage assembly. The ramp load mechanism 25 holds the magnetic heads in a retracted position at a distance from the magnetic disk when the heads are moved to the outermost periphery of the disk. The board unit 21 includes a head IC and the like.

A printed circuit board (not shown) is screwed to the outer surface of a bottom wall of the case 12. The circuit board controls the operations of the spindle motor 18, VCM 24, and magnetic heads through the board unit 21.

The magnetic disk 16 has magnetic recording layers on its upper and lower surfaces, individually. Lubricant 17, e.g., oil is coated on the surfaces of the magnetic disk 16 with a thickness of about 1 nm. The disk 16 is fitted on a hub (not shown) of the spindle motor 18 and fixed on the hub by a clamp spring 17. If the motor 18 is driven, the disk 16 is rotated at a predetermined speed of, for example, 4,200 rpm in the direction of arrow B.

The carriage assembly 22 is provided with a bearing portion 26, which is fixed on the bottom wall of the case 12, and arms 32 that extend from the bearing portion. The arms 32 are situated parallel to the surfaces of the magnetic disk 16 and spaced from one another. They extend in the same direction from the bearing portion 26. The carriage assembly 22 is provided with suspensions 38 that are elastically deformable elongated plates. Each suspension 38 is formed of a leaf spring, of which the proximal end is fixed to the distal end of its corresponding arm 32 by spot welding or adhesive bonding and which extends from the arm. Alternatively, each suspension may be formed integrally with its corresponding arm 32. The arm 32 and the suspension 38 constitute a head suspension, and the head suspension and the magnetic heads 40 constitute a head suspension assembly.

Figure 2:
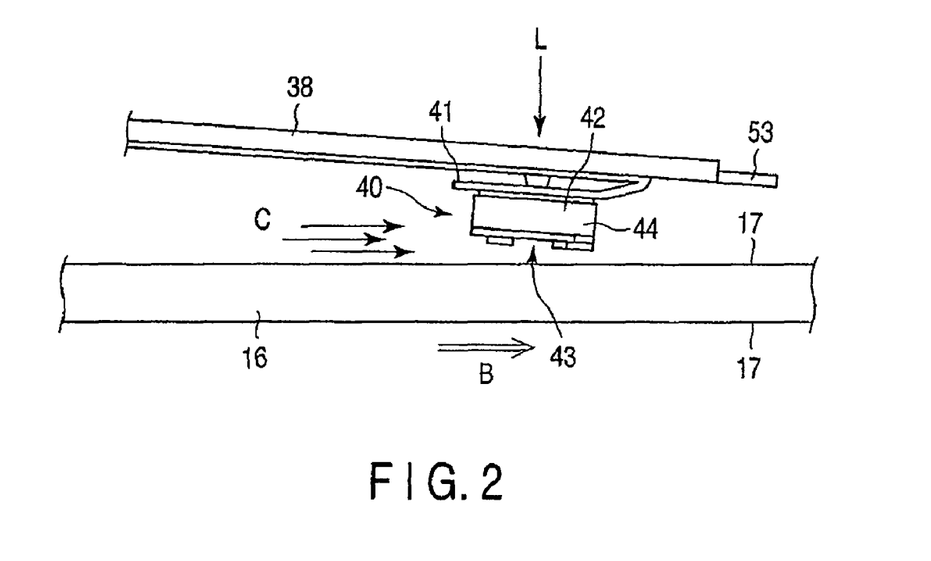
FIG. 2 is an exemplary enlarged side view showing a magnetic head portion of the HDD.

As shown in FIG. 2, each magnetic head 40 includes a slider 42 substantially in the shape of a rectangular parallelepiped and a recording/reproducing head portion 44 on the slider. It is fixed to a gimbal spring 41 that is provided on the distal end portion of each suspension 38. Each magnetic head 40 is subjected to a head load L that is directed to a surface of the magnetic disk 16 by the elasticity of the suspension 38.

As shown in FIG. 1, the carriage assembly 22 includes a support frame 45 that extends from the bearing portion 26 oppositely from the arms 32. The support frame supports a voice coil 47 that constitutes a part of the VCM 24. The support frame 45 is molded from plastic and formed integrally on the outer periphery of the voice coil 47. The voice coil 47 is situated between a pair of yokes 49 that are fixed on the case 12 and, in conjunction with these yokes and a magnet (not shown) fixed to one of the yokes, constitutes the VCM 24. If the voice coil 47 is energized, the carriage assembly 22 rotates around the bearing portion 26, whereupon each magnetic head 40 is moved to and positioned in a region over a desired track of the magnetic disk 16.

The ramp load mechanism 25 includes a ramp 51 and tabs 53. The ramp 51 is provided on the bottom wall of the case 12 and located outside the magnetic disk 16. The tabs 53 extend individually from the respective distal ends of the suspensions 38. As the carriage assembly 22 rotates to its retracted position outside the magnetic disk 16, each tab 53 engages with a ramp surface on the ramp 51 and is then pulled up along the slope of the ramp surface, whereupon each magnetic head is unloaded.

Figure 3:
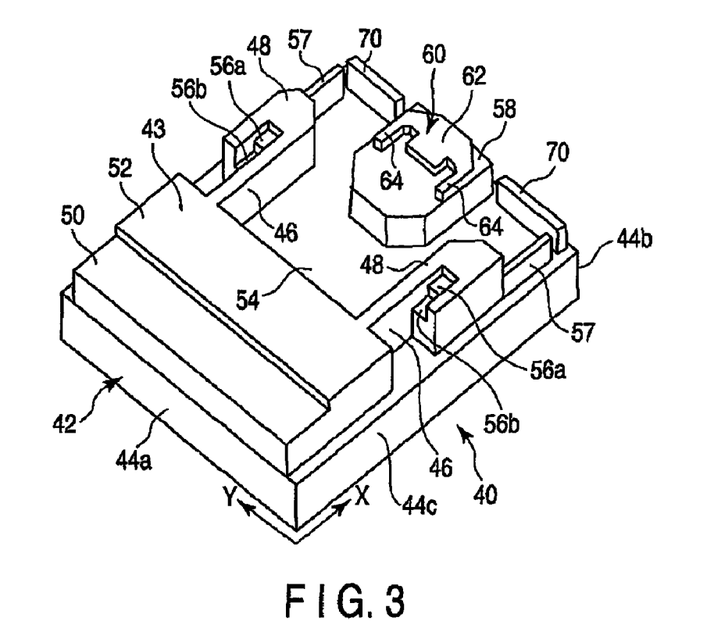
FIG. 3 is an exemplary perspective view showing the disk-facing surface side of a slider of the magnetic head.

The following is a detailed description of each magnetic head 40. FIG. 3 is a perspective view showing the slider of the magnetic head, FIG. 4 is a plan view of the slider, and FIG. 5 is a sectional view of the slider.

Figure 4:
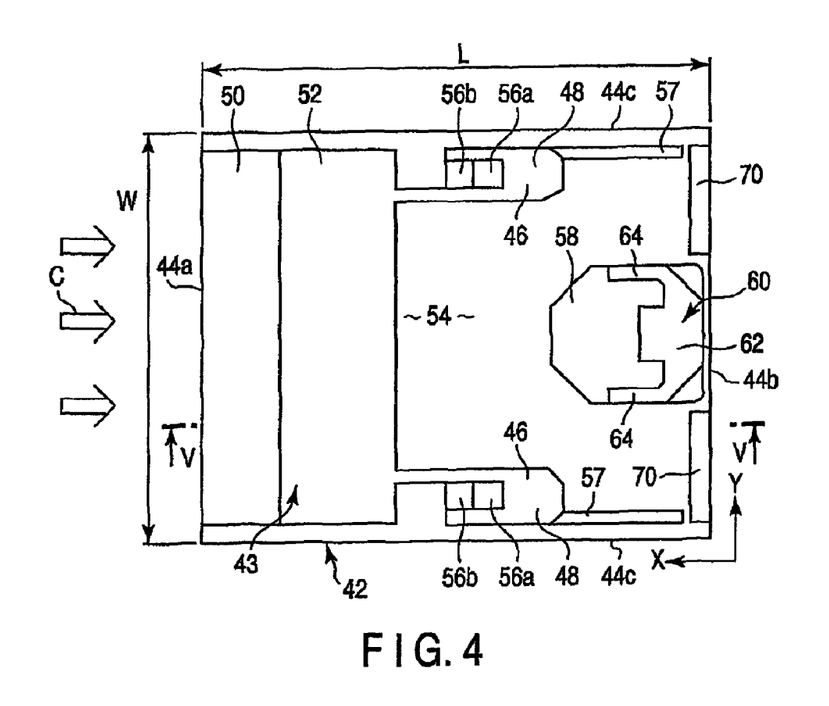
FIG. 4 is an exemplary plan view showing the disk-facing surface side of the slider.
Figure 5:
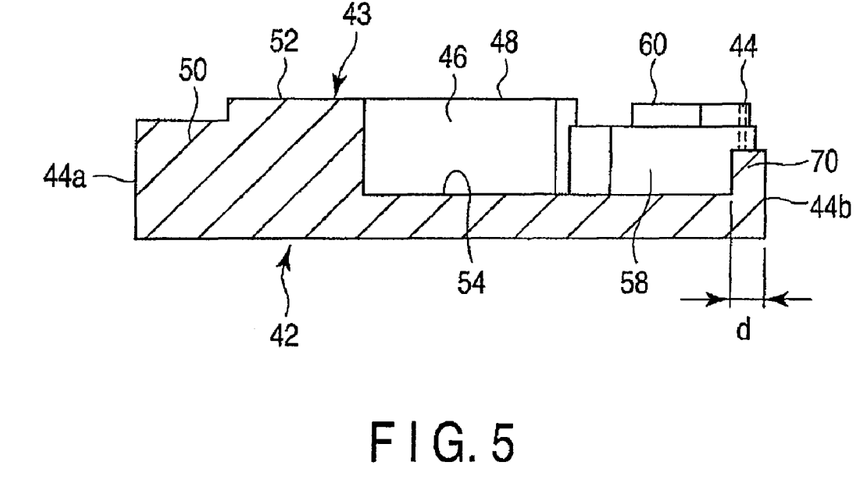
FIG. 5 is an exemplary sectional view taken along line V-V of FIG. 4.

As shown in FIGS. 3 to 5, the magnetic head 40 includes the slider 42 that is substantially in the shape of a rectangular parallelepiped. The slider has a rectangular disk-facing surface (ABS) 43, inlet-side end surface 44a, outlet-side end surface 44b, and a pair of side surfaces 44c. The disk-facing surface 43 faces a surface of the magnetic disk 16. The end surfaces 44a and 44b and the side surfaces 44c extend at right angles to the disk-facing surface.

The longitudinal direction of the disk-facing surface 43 is supposed to be a first direction X, and the transverse direction perpendicular thereto to be a second direction Y. The slider 42 is formed as a so-called femto slider, having a length L of 1.25 mm or less, e.g., 0.85 mm, in the first direction X and a width W of 1.0 mm or less, e.g., 0.7 mm, in the second direction Y.

The magnetic head 40 is constructed as a flying head, in which the slider 42 is caused to fly by airflows C (see FIG. 2) that are produced between the disk surface and the disk-facing surface 43 as the magnetic disk 16 rotates. When the HDD is operating, the disk-facing surface 43 of the slider 42 never fails to be opposed to the disk surface with a gap therebetween. The direction of the airflows C is coincident with the direction of rotation B of the magnetic disk 16. The slider 42 is located so that the first direction X of the disk-facing surface 43 opposed to the surface of the disk 16 is substantially coincident with the direction of the airflows C.

As shown in FIGS. 3 to 5, a negative-pressure cavity 54, a recess, is formed spanning from a substantially central part of the disk-facing surface 43 to the outlet end side. The cavity 54 opens downstream. The thickness of the slider 42 is adjusted to, for example, 0.23 mm, and the depth of the cavity 54 to 600 to 1,300 nm, e.g., to 1,200 nm. The negative-pressure cavity 54 serves to produce a negative pressure on the central part of the disk-facing surface 43 at every feasible yaw angle for the HDD.

A substantially rectangular leading step portion 50 is formed on the inlet-side end portion of the disk-facing surface 43. The leading step portion 50 protrudes from the bottom surface of the negative-pressure cavity 54 so as to be one level lower than the disk-facing surface 43 and is situated on the inlet side of the cavity 54 with respect to the airflows C.

A pair of side portions 46 are formed on the disk-facing surface 43. They extend along the side edges of the surface 43 and are opposed to each other with a space in the second direction Y between them. The side portions 46 extend from the leading step portion 50 toward the downstream end of the slider 42. The leading step portion 50 and the pair of side portions 46 are arranged symmetrically with respect to the central axis of the slider 42. As a whole, they are substantially U-shaped, closed on the upstream side and open downstream. The leading step portion 50 and the side portions 46 define the negative-pressure cavity 54.

In order to maintain the pitch angle of the magnetic head 40, a leading pad 52 that utilizes an air film to support the slider 42 protrudes from the leading step portion 50. The leading pad 52 continuously extends throughout the area that covers the width of the leading step portion 50 along the second direction Y, and is formed in a position deviated downstream from the inlet-side end surface 44a of the slider 42.

A side pad 48 is formed on each side portion 46 and connects with the leading pad 52. The pads 52 and 48 are formed substantially flat and form the disk-facing surface 43.

A first recess 56a and a second recess 56b are continuously formed in each side pad 48. The first and second recesses 56a and 56b open toward the inlet-side end of the disk-facing surface 43 as well as toward the magnetic disk surface. Each of the recesses 56a and 56b has a rectangular shape defined by a pair of side edges, which extend substantially parallel to the first direction X, and a bottom edge, which connects the respective extended ends of the side edges and extends substantially parallel to the second direction Y. The second recess 56b is formed to be one level deeper than the first recess 56b.

A pair of skirt portions 57 are formed on the disk-facing surface 43 of the slider 42. They extend individually from the side portions 46 toward the outlet-side end of the slider along the first direction X. Each skirt portion 57 is formed to be deeper than each side portion 46 and protrudes from the bottom surface of the negative-pressure cavity 54.

The slider 42 includes a trailing step portion 58 that is formed on the outlet-side end portion of the disk-facing surface 43 with respect to the airflows C. The trailing step portion 58 is formed protruding from the bottom surface of the negative-pressure cavity 54 so that its projection height is equal to that of the leading step portion 50. In other words, the trailing step portion 58 is formed so that its depth from the disk-facing surface 43 is equal to that of the leading step portion 50, ranging from 50 to 250 nm, e.g., 100 nm. The trailing step portion 58 is situated on the downstream side of the cavity 54 with respect to the airflows C and substantially in the center of the disk-facing surface 43 with respect to the second direction Y. Further, the trailing step portion 58 is slightly shifted from the outlet-side end surface 44b of the slider 42 toward the inlet-side end surface 44a.

As shown in FIGS. 3 to 5, the trailing step portion 58 is substantially in the shape of a rectangular parallelepiped, of which two corner portions on the upstream side are chamfered. The trailing step portion 58 has a top surface that faces the magnetic disk surface.

A trailing pad 60 that utilizes an air film to support the slider 42 protrudes from the top surface of the trailing step portion 58. The trailing pad 60 is formed on the same height level as the leading pad 52 and the side pads 48, and its surface constitutes the disk-facing surface 43.

The trailing pad 60 includes a substantially rectangular base portion 62 and a pair of wing portions 64 that extend from the base portion to opposite sides along the second direction Y. At the trailing step portion 58, the base portion 62 is provided on the central axis D on the outlet end side and situated substantially in the center with respect to the second direction Y. Each wing portion 64 extends in the first direction X from the opposite ends of the base portion 62 toward the upstream end of the slider 42.

The slider 42 is formed on the disk-facing surface 43 and includes a pair of embossed portions 70. The embossed portions 70 are formed shallower than the negative-pressure cavity 54, project above the bottom surface of the cavity 54, and are provided on the outlet end side of the cavity 54 with respect to the airflows C. The embossed portions 70 are each formed in the shape of a rectangular plate, individually extend along the second direction Y, and are situated individually on the opposite sides of the trailing step portion 58 with respect to the second direction. The embossed portions 70 are lower than the trailing step portion 58 with respect to the negative-pressure cavity 54, that is, deeper than the trailing step portion with respect to the facing surface 43, having a depth of 200 to 800 nm, e.g., 400 nm. The top surface of each embossed portion 70 is a flat surface that faces the magnetic disk surface.

Further, the pair of embossed portions 70 are formed along the outlet-side end of the slider 42, and the end surface of each embossed portion is formed flush with the outlet-side end surface 44b of the slider 42. Each embossed portion 70 extends from near the trailing step portion 58 to the vicinity of each corresponding side surface 44c of the slider 42 along the second direction Y. Further, each embossed portion 70 has a width d that extends upstream from the outlet-side end surface of the slider 42 along the first direction X. The pair of skirt portions 57 extend individually from the side portions 46 toward the embossed portions 70, and their respective extended ends face the embossed portions 70 with small gaps between them.

As shown in FIG. 5, the head portion 44 of the magnetic head 40 includes a recording element and a reproducing element, which record and reproduce information to and from the magnetic disk 16. The reproducing and recording elements are embedded in the downstream end portion of the slider 42 with respect to the direction of the airflows C. The reproducing and recording elements have a read/write gap (not shown) that is defined in the trailing pad 60.

According to the HDD and the head suspension assembly constructed in this manner, the magnetic head 40 is caused to fly by the airflows C that are produced between the disk surface and the disk-facing surface 43 as the magnetic disk 16 rotates. When the HDD is operating, therefore, the disk-facing surface 43 of the slider 42 never fails to be opposed to the disk surface with a gap therebetween. As shown in FIG. 2, the magnetic head 40 flies in an inclined posture such that the read/write gap of the head portion 44 is located closest to the disk surface.

Since the disk-facing surface 43 of the slider 42 is provided with the negative-pressure cavity 54, the magnetic head 40 can produce a negative pressure on the central part of the surface 43 at every feasible yaw angle for the HDD. Further, the embossed portions 70 are provided in the cavity at the air outlet end of the slider 42. Therefore, the occurrence of so-called backflows such that the airflows run reversely from the air outlet end side of the slider to the air inlet end side can be suppressed, so that adhesion of a lubricant to the slider can be reduced.

Figure 6:
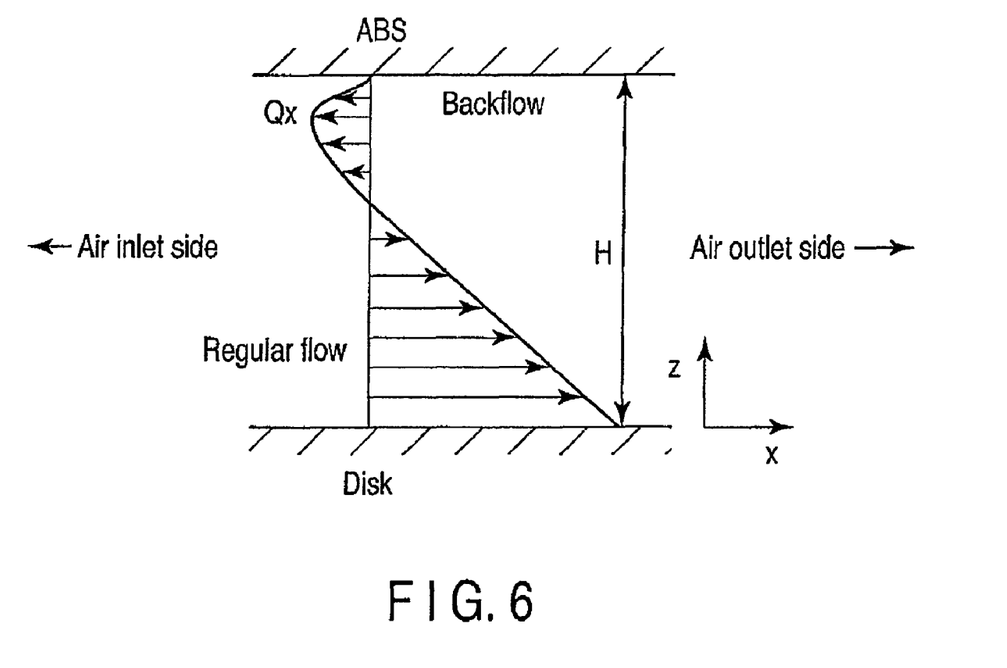
FIG. 6 is an exemplary conceptual diagram for illustrating backflows between a disk surface and the slider.

The following is a description of a mechanism for reducing backflows in the slider. FIG. 6 is a conceptual diagram for illustrating the backflows. A mathematical expression for obtaining a flow rate Qx of backflows in the longitudinal direction of the slider (first direction X) is given as follows:

$$Qx = \int_0^H u\,dz = VH/2 - H^3/12\mu \cdot \partial P/\partial x$$

In the above expression, u is the longitudinal speed function of the slider, V is the disk speed, H is the gap height between the disk surface and the slider ABS, μ is the coefficient of viscosity, P is the air film pressure, and x is the longitudinal direction of the slider.

It can be seen that the flow rate Qx can be effectively made positive by reducing the gap height H if the disk speed V is constant, since $H^3$ exists in the second term of the above equation. In the present embodiment, therefore, the embossed portions 70 are arranged in the negative-pressure cavity on the air outlet end side of the slider 42 to reduce the gap height H above the disk surface. By doing this, the airflows can be changed from backflows into regular flows (from the air inlet side to the outlet side). In consequence, the backflows can be reduced to reduce the adhesion of the lubricant to the slider.

Figure 7:
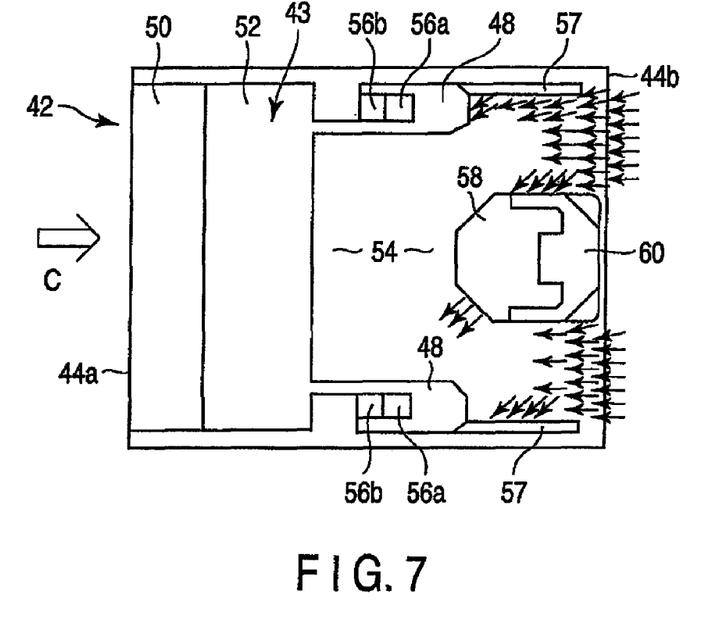
FIG. 7 is an exemplary plan view showing a slider of a magnetic head without embossed portions, given as Comparative Example 1.
Figure 8:
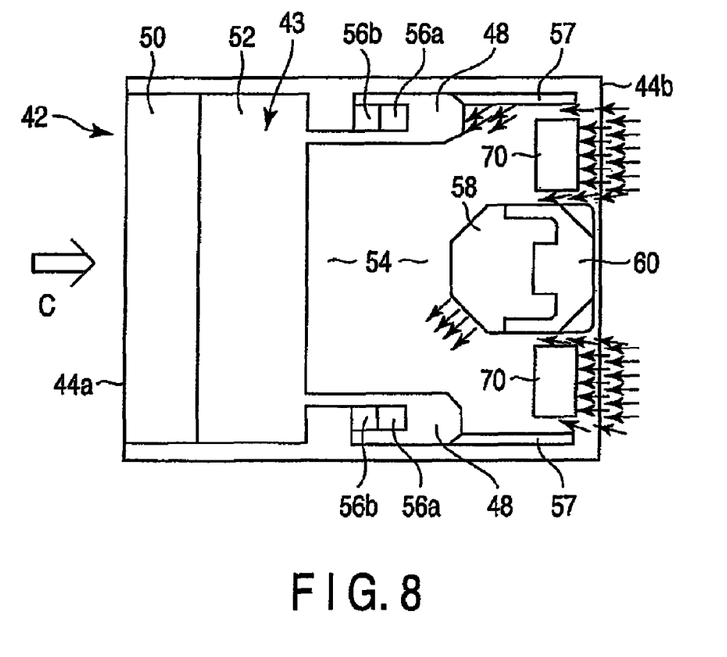
FIG. 8 is an exemplary plan view showing a slider of a magnetic head as Comparative Example 2 in which embossed portions are shifted from an outlet end surface of a slider toward the inlet side.
Figure 9:
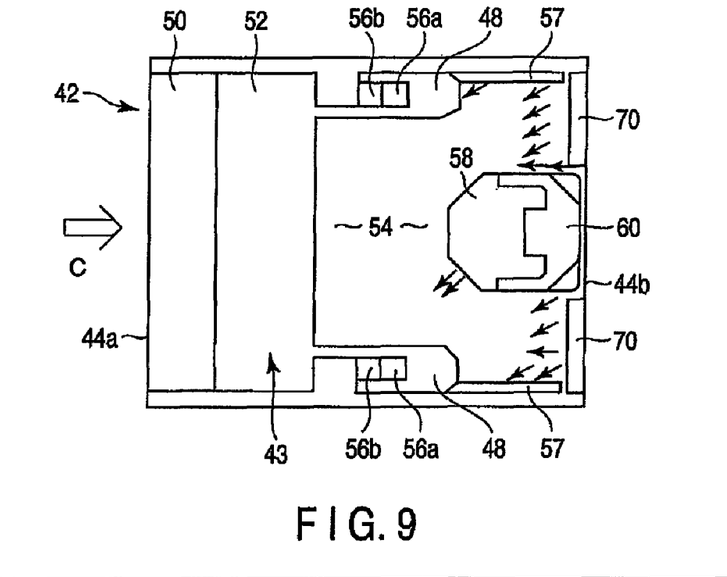
FIG. 9 is an exemplary plan view showing the slider of the magnetic head according to the first embodiment.

The inventor hereof prepared the magnetic head according to the embodiment described above and magnetic heads according to comparative examples. For each of these magnetic heads, the flow speed (state of backflows) of air that flows near the disk-facing surface of the slider was analyzed, and the flying height of the slider from the inner periphery to the outer periphery of the magnetic disk was simulated. FIG. 7 shows a magnetic head according to Comparative Example 1, FIG. 8 shows a magnetic head according to Comparative Example 2, and FIG. 9 shows the magnetic head according to the present embodiment. In these drawings, arrows represent backflows, and it is indicated that the higher the density of the arrows, the larger the backflows are.

The magnetic head according to Comparative Example 1 is not provided with any embossed portions at the outlet-side end portion of a negative-pressure cavity 54 of a slider 42, but shares other configurations with the present embodiment. In the magnetic head of Comparative Example 1, relatively large backflows occur from the outlet-side end surface 44b of the slider 42 into the cavity 54.

The magnetic head according to Comparative Example 2 is provided with embossed portions 70 formed at the outlet-side end portion of a negative-pressure cavity 54 of a slider 42. Each embossed portion is shifted from an outlet-side end surface 44b of the slider toward the inlet end side, and a space is defined between the outlet end surface and the embossed portion. Other configurations are common to Comparative Example 2 and the present embodiment.

In the magnetic head of the Comparative Example 2, compared with the magnetic head of Comparative Example 1, although the backflows are reduced, relatively large backflows occur in a region between the outlet-side end surface 44b of the slider 42 and each embossed portion 70.

In the magnetic head according to the present embodiment, the backflows from the air outlet end of the slider 42 are considerably reduced, when compared with Comparative Examples 1 and 2, as seen from FIG. 9. If the depth of the embossed portions 70 ranges from 250 to 800 nm, the embossed portions can produce an effect to reduce the backflows as aforesaid.

Figure 10:
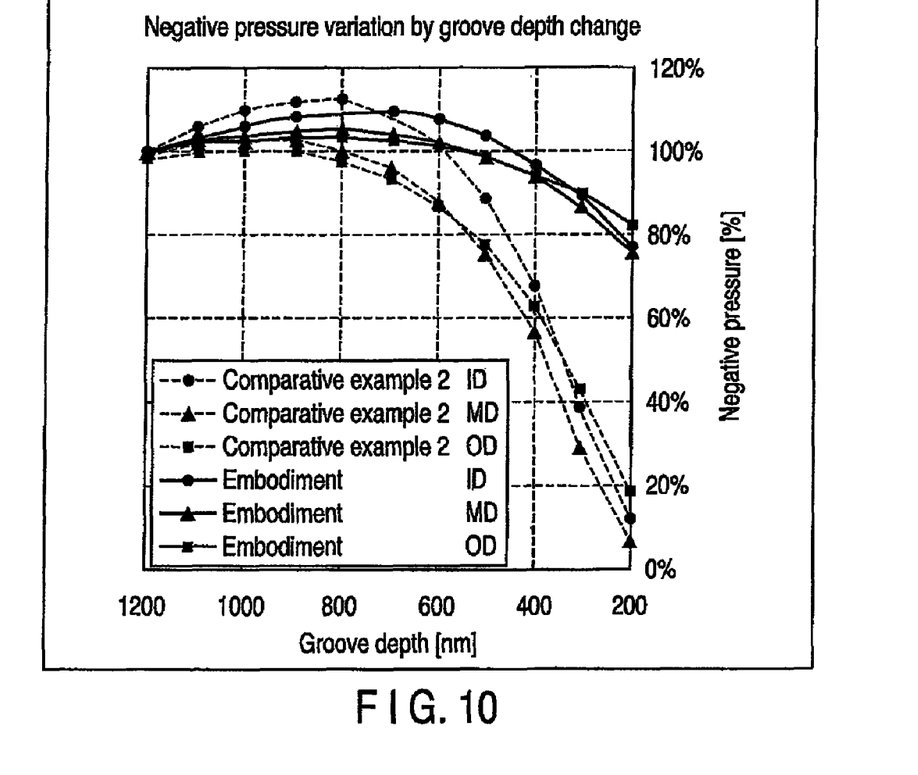
FIG. 10 is an exemplary diagram showing negative pressure variations involved in changes of the groove depth of the sliders of the magnetic according to the present embodiment and Comparative Example 2, for the inner peripheral portion, middle portion, and outer peripheral portion of the disk.
Figure 11:
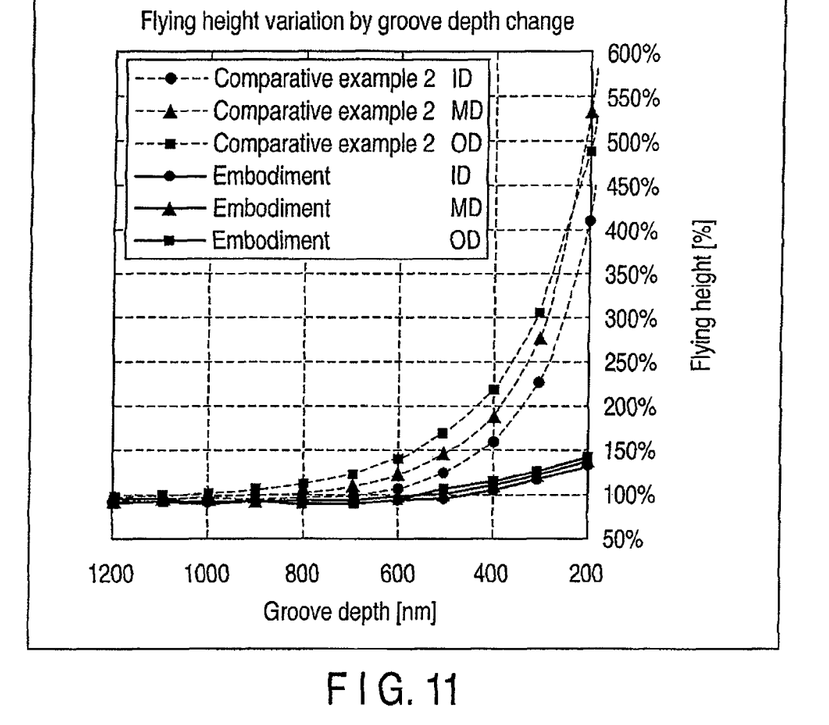
FIG. 11 is an exemplary diagram showing flying height variations involved in changes of the groove depth of the sliders of the magnetic according to the present embodiment and Comparative Example 2, for the inner peripheral portion, middle portion, and outer peripheral portion of the disk.

FIG. 10 shows results of simulation of negative pressure variations involved in changes of the depth (groove depth) of the negative-pressure cavity of the magnetic head of Comparative Example 2 and those involved in changes of the depth (groove depth) of the embossed portions of the magnetic head of the present embodiment. FIG. 11 shows results of simulation of head flying height variations involved in changes of the depth of the cavity of the magnetic head of Comparative Example 2 and those involved in changes of the depth of the embossed portions of the magnetic head of the present embodiment.

According to the magnetic head of Comparative Example 2, as shown in FIGS. 10 and 11, the negative pressure is considerably reduced and the head flying height is inevitably increased to an extreme as the groove depth decreases, in any of positions including a position (ID) that faces the inner periphery of the magnetic disk, a position (MD) that faces a radially middle portion of the disk, and a position (OD) that faces the outer periphery of the disk.

According to the magnetic head of the present embodiment, on the other hand, the negative pressure hardly changes and the head flying height variations are hardly influenced if the depth of (groove depth) of the embossed portions are changed, in any of the positions including the position (ID) that faces the inner periphery of the magnetic disk, the position (MD) that faces the radially middle portion of the disk, and the position (OD) that faces the outer periphery of the disk, as seen from the diagrams.

As mentioned before, moreover, the effect to reduce the backflows can be obtained only if the depth of the embossed portions 70 is not larger than 800 nm. If a reduction in the negative pressure is taken into consideration, however, the depth of the embossed portions should preferably be adjusted to 200 nm or more.

Accordingly, the embossed portions are provided in the negative-pressure cavity on the air outlet end side of the slider so as to be flush with the outflow-side end surface of the slider. By doing this, backflows such that the airflows run reversely from the air outlet side of the slider to the air inlet side can be prevented, so that adhesion of the lubricant to the slider can be reduced. Thus, there can be obtained a head of improved reliability and stability, a head suspension assembly provided with the head, and a disk device.

Figure 12:
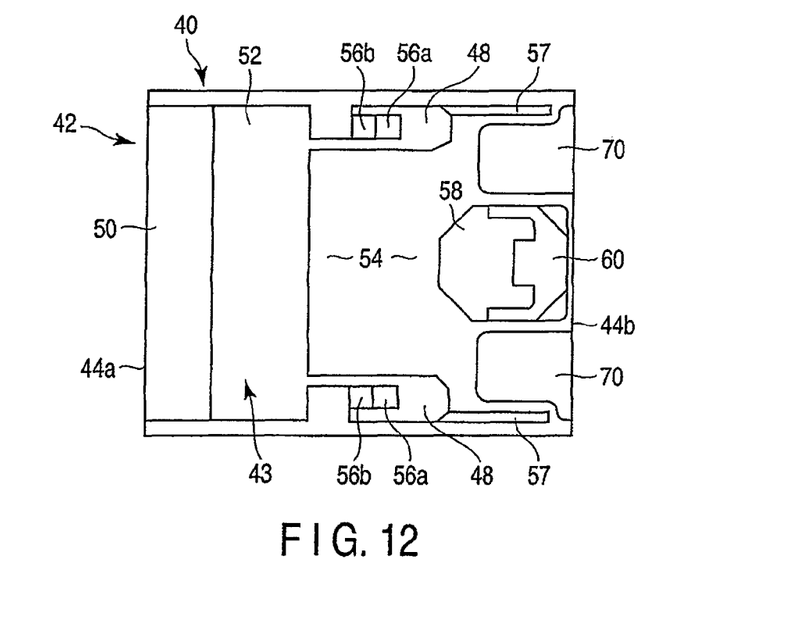
FIG. 12 is an exemplary plan view showing the disk-facing surface side of a magnetic head according to a second embodiment of the invention.

FIG. 12 shows a magnetic head 40 of a disk device according to a second embodiment of this invention. According to the present embodiment, each of embossed portions 70 formed in a slider 42 has a large width along the first direction X and extends from an outlet-side end surface 44b of the slider 42 to the vicinity of each corresponding side pad 48.

Figure 13:
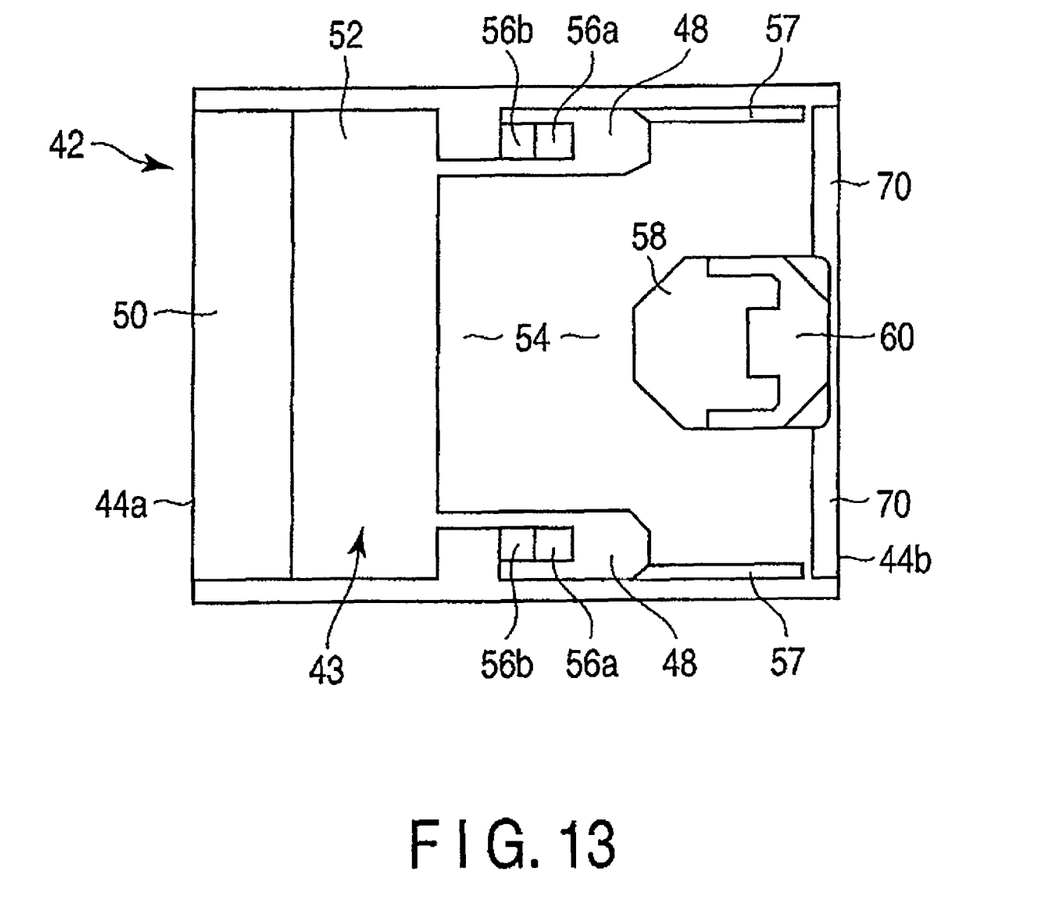
FIG. 13 is an exemplary plan view showing the disk-facing surface side of a magnetic head according to a third embodiment of the invention.

In a magnetic head 40 of a disk device according to a third embodiment of this invention, as shown in FIG. 13, moreover, a pair of embossed portions 70 formed on a slider 42 are connected to each other in the position of a trailing step portion 58 and continuously extend along the second direction Y of the slider. These embossed portions 70 are formed flush with an outlet-side end surface 44b of the slider.

In the second and third embodiments, the depth of the embossed portions 70 above the disk-facing surface 43 is larger than that of the trailing step portion 58. In these embodiments, moreover, other configurations of the magnetic disk device including the magnetic heads are the same as those of the foregoing first embodiment, so that like reference numbers are used to designate like portions, and a detailed description thereof is omitted. Further, the same functions and effects of the first embodiment can also be obtained with the second and third embodiments.

While certain embodiments of the invention have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

The shapes, dimensions, etc., of the leading step portion, trailing step portion, embossed portions, and pads of the slider are not limited to the embodiment described herein but may be varied as required. This invention is not limited to femto sliders but may also be applied to pico sliders, pemto sliders, or any other larger sliders. Further, two or more disks, instead of one, may be regularly used in the disk device.

What is claimed is:

1. A head comprising:
a slider comprising a facing surface opposed to a surface of a rotatable recording medium, an inlet-side end surface extending across the facing surface, and an outlet-side end surface extending across the facing surface, and configured to fly by an airflow produced between the recording medium surface and the facing surface as the recording medium rotates; and
a head portion on the slider, configured to record information to the recording medium and to reproduce the information from the recording medium,
the facing surface of the slider having a first direction along the airflow and a second direction perpendicular to the first direction,
the slider comprising:
a negative-pressure cavity in the facing surface, configured to produce a negative pressure;
a leading step portion on the facing surface, projecting from the negative-pressure cavity, and situated on an upstream side of the negative-pressure cavity with respect to the airflow;
a pair of side portions individually formed on the facing surface, projecting from the negative-pressure cavity, extending from the leading step portion toward the outlet end side of the slider in the first direction, and opposed to each other with a space between the pair in the second direction;
a trailing step portion formed on the facing surface, projecting from the negative-pressure cavity, situated on an outlet side of the negative-pressure cavity with respect to the airflow, and comprising a top surface opposed to the recording medium;
a pair of skirt portions on the facing surface, extending individually from the side portions toward the outlet end side of the slider in the first direction; and
a pair of embossed portions on the outlet side of the negative-pressure cavity with respect to the airflow, configured to suppress airflows running reversely from the outlet side to the inlet side of the slider, the embossed portions individually extending in the second direction and being situated individually on the opposite sides of the trailing step portion with respect to the second direction, the embossed portions being lower than the trailing step portion with respect to the negative-pressure cavity and flush with the outlet-side end surface of the slider, each of the embossed portions comprising an outer end portion which is flush with the outlet-side end surface of the slider and opposes a trailing side end of the respective skirt portion in the first direction with a gap.

2. The head of claim 1, wherein a width of each embossed portion is defined by an upstream end and the outlet-side end surface along the first direction.

3. The head of claim 1, wherein the pair of embossed portions are connected together in the second direction.

4. The head of claim 1, wherein the slider is a femto slider having a length of 0.85 mm in the first direction and a width of 0.7 mm in the second direction, a depth of the trailing step portion ranges from 50 nm to 250 nm, and a depth of each embossed portion ranges from 250 nm to 800 nm.

5. A head suspension assembly used in a disk device comprising a disk recording medium and a drive section configured to support and rotate the recording medium, the head suspension assembly comprising:
a head comprising a slider comprising a facing surface opposed to a surface of a rotatable recording medium, an inlet-side end surface extending across the facing surface, and an outlet-side end surface extending across the facing surface, and is caused to fly by an airflow produced between the recording medium surface and the facing surface as the recording medium rotates, and a head portion on the slider, configured to record information to the recording medium and to reproduce the information from the recording medium; and
a head suspension configured to support the head for movement with respect to the recording medium and to apply a head load directed toward the surface of the recording medium to the head,
the facing surface of the slider having a first direction along the airflow and a second direction perpendicular to the first direction,
the slider comprising:
a negative-pressure cavity in the facing surface, configured to produce a negative pressure;
a leading step portion on the facing surface, projecting from the negative-pressure cavity, and situated on an upstream side of the negative-pressure cavity with respect to the airflow;
a pair of side portions individually formed on the facing surface, projecting from the negative-pressure cavity, extending from the leading step portion toward the outlet end side of the slider in the first direction, and opposed to each other with a space between the pair in the second direction;

a trailing step portion formed on the facing surface, projecting from the negative-pressure cavity, situated on an outlet side of the negative-pressure cavity with respect to the airflow, and comprising a top surface opposed to the recording medium;

a pair of skirt portions on the facing surface, extending individually from the side portions toward the outlet end side of the slider in the first direction; and a pair of embossed portions on the outlet side of the negative-pressure cavity with respect to the airflow, configured to suppress airflows running reversely from the outlet side to the inlet side of the slider, the embossed portions individually extending in the second direction and being situated individually on the opposite sides of the trailing step portion with respect to the second direction, the embossed portions being lower than the trailing step portion with respect to the negative-pressure cavity and flush with the outlet-side end surface of the slider, each of the embossed portions comprising an outer end portion which is flush with the outlet-side end surface of the slider and opposes a trailing side end of the respective skirt portion in the first direction with a gap.

6. A disk device comprising:

a disk recording medium;

a drive section configured to support and rotate the recording medium;

a head comprising a slider comprising a facing surface opposed to a surface of a rotatable recording medium, an inlet-side end surface extending across the facing surface, and an outlet-side end surface extending across the facing surface, and is caused to fly by an airflow produced between the recording medium surface and the facing surface as the recording medium rotates, and a head portion on the slider, configured to record information to the recording medium and to reproduce the information from the recording medium; and a head suspension configured to support the head for movement with respect to the recording medium and to apply a head load directed toward the surface of the recording medium to the head, the facing surface of the slider having a first direction along the airflow and a second direction perpendicular to the first direction, the slider comprising:

a negative-pressure cavity in the facing surface, configured to produce a negative pressure;

a leading step portion on the facing surface, projecting from the negative-pressure cavity, and situated on an upstream side of the negative-pressure cavity with respect to the airflow;

a pair of side portions individually formed on the facing surface, projecting from the negative-pressure cavity, extending from the leading step portion toward the outlet end side of the slider in the first direction, and opposed to each other with a space between the pair in the second direction;

a trailing step portion formed on the facing surface, projecting from the negative-pressure cavity, situated on an outlet side of the negative-pressure cavity with respect to the airflow, and comprising a top surface opposed to the recording medium;

a pair of skirt portions on the facing surface, extending individually from the side portions toward the outlet end side of the slider in the first direction; and a pair of embossed portions on the outlet side of the negative-pressure cavity with respect to the airflow, configured to suppress airflows running reversely from the outlet side to the inlet side of the slider, the embossed portions individually extending in the second direction and being situated individually on the opposite sides of the trailing step portion with respect to the second direction, the embossed portions being lower than the trailing step portion with respect to the negative-pressure cavity and flush with the outlet-side end surface of the slider, each of the embossed portions comprising an outer end portion which is flush with the outlet-side end surface of the slider and opposes a trailing side end of the respective skirt portion in the first direction with a gap.

* * * * *